United States Patent [19]
Fletcher et al.

[11] Patent Number: 5,549,231
[45] Date of Patent: Aug. 27, 1996

[54] BICYCLE CARRIER FOR MOTOR VEHICLES

[76] Inventors: James D. Fletcher, 4661 Calienta - Bodfish Rd., Calienta, Calif. 93518; Terry L. Harris, 3200 Ferrell Ave., Lake Isabella, Calif. 93240

[21] Appl. No.: 184,991

[22] Filed: Jan. 24, 1994

[51] Int. Cl.⁶ .................................................. B60R 9/10
[52] U.S. Cl. .......................... 224/536; 224/495; 224/510; 224/519; 224/523; 224/924; 211/19; 211/20
[58] Field of Search .................... 224/42.03 B, 42.06, 224/42.12, 42.45 R, 324, 42.26, 42.27, 42.13, 42.03 R, 42.43, 42.44; 211/17, 19, 20, 23, 24, 5; 24/16 R; 403/DIG. 1; 248/225.31, 214, 215, 218.4; 280/495, 204, 786, 789, 795, 797, 107; 410/16, 19, 20; 269/40, 60, 65

[56] References Cited

U.S. PATENT DOCUMENTS

| | | | |
|---|---|---|---|
| 698,277 | 4/1902 | Hammond | 211/20 |
| 1,203,398 | 10/1916 | Perkins | 224/42.26 |
| 3,581,962 | 6/1971 | Osborn | 224/324 |
| 3,912,139 | 10/1975 | Bowman | 224/42.45 R |
| 3,964,699 | 6/1976 | Stankovich | 224/42.03 B |
| 3,993,229 | 11/1976 | Summers . | |
| 4,015,718 | 4/1977 | Bernard | 211/5 |
| 4,063,647 | 12/1977 | Blackmore | 211/19 |
| 4,084,736 | 4/1978 | Jacobs, Jr. . | |
| 4,189,274 | 2/1980 | Shaffer . | |
| 4,275,981 | 6/1981 | Bruhn . | |
| 4,348,035 | 9/1982 | Wasservogel | 280/495 |
| 4,524,893 | 6/1985 | Cole . | |
| 4,815,638 | 3/1989 | Hutyra | 224/42.03 B |
| 4,823,997 | 4/1989 | Krieger | 224/42.03 B |
| 4,938,399 | 7/1990 | Hull et al. | 224/42.45 R |
| 5,092,504 | 3/1992 | Hannes et al. . | |
| 5,127,564 | 7/1992 | Romero | 224/42.45 R |
| 5,232,134 | 8/1993 | Allen . | |
| 5,377,886 | 1/1995 | Sickler | 224/42.03 R |
| 5,435,475 | 7/1995 | Hudson et al. | 224/924 |
| 5,445,300 | 8/1995 | Eipper et al. | 224/924 |

FOREIGN PATENT DOCUMENTS

| | | | |
|---|---|---|---|
| 561646 | 9/1993 | European Pat. Off. | 211/17 |
| 2413241 | 8/1979 | France | 224/315 |
| 466850 | 10/1928 | Germany | 211/17 |

*Primary Examiner*—Henry J. Recla
*Assistant Examiner*—Gregory M. Vidovich
*Attorney, Agent, or Firm*—Henry M. Bissell

[57] ABSTRACT

Various arrangements of a bicycle carrier for transport by motorized vehicle include a particular type of clamping device for securely gripping the tire of a bicycle wheel mounted therein. The clamp comprises a pair of generally parallel, spaced-apart side panels adapted to receive a bicycle wheel and frictionally engage the tire when the panels are drawn together by a suitable closure, such as a bolt and nut combination. Theft protection is afforded by a padlock extending through holes in the two panels. In one arrangement, the clamp is stamped of sheet metal with the side panels being flexible enough to accommodate being drawn together by the adjustable closure. In another arrangement, the side panels are hinged to a base plate so that they can be pivoted into frictional engagement with the bicycle tire. The carrier mounts transversely on a longitudinal support member adapted for installation in the receiver portion of a conventional vehicle-mounted trailer hitch.

24 Claims, 3 Drawing Sheets

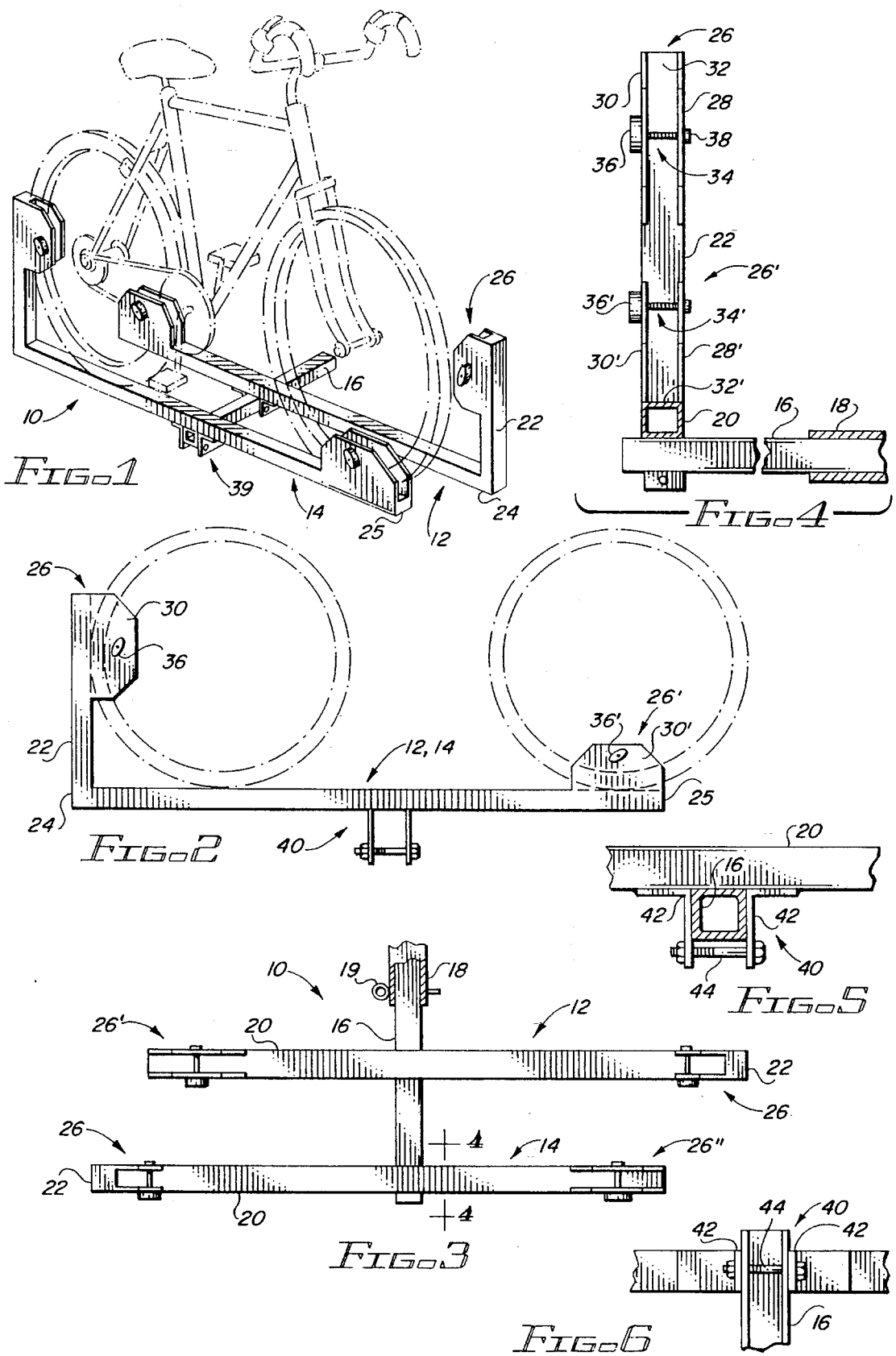

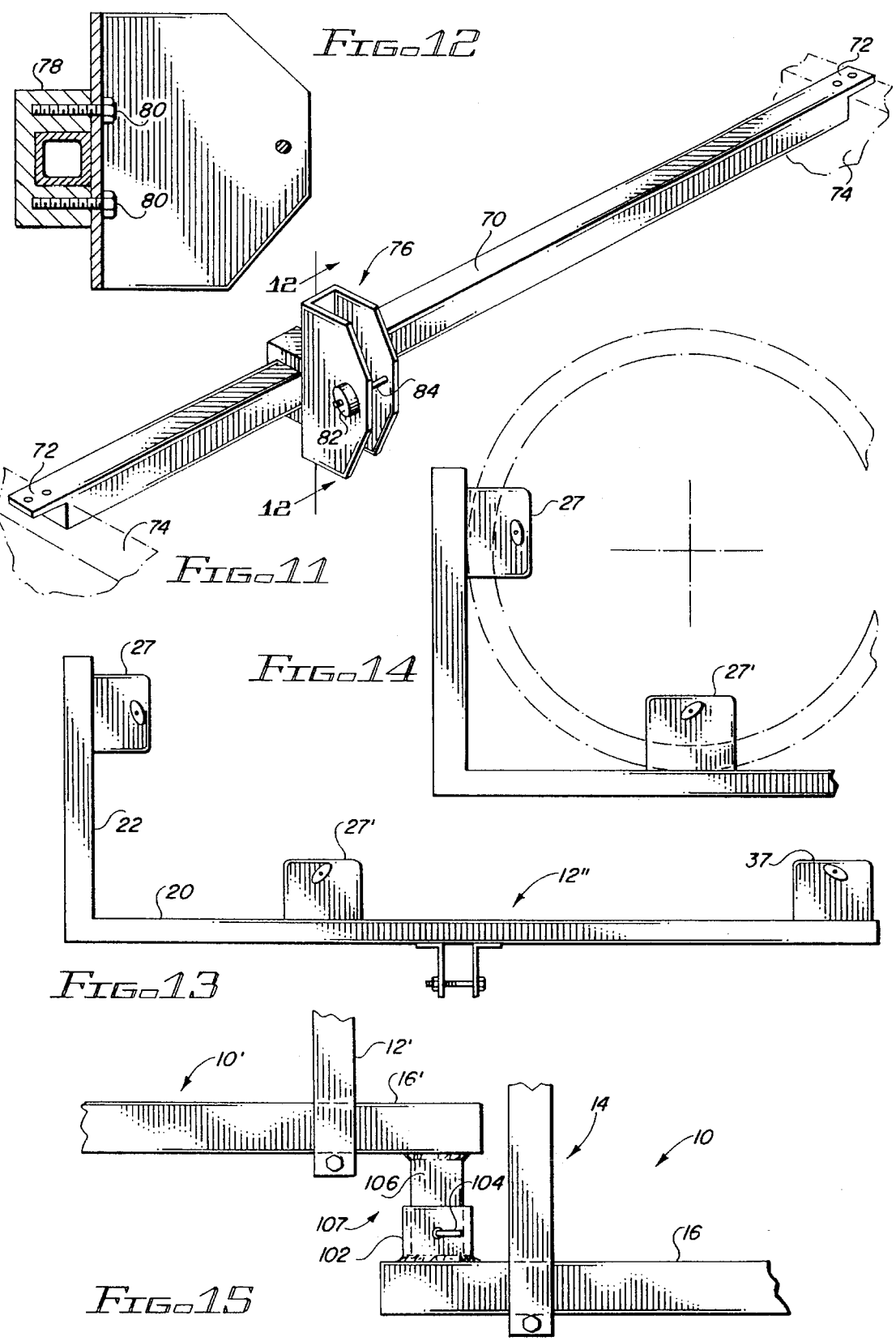

BICYCLE CARRIER FOR MOTOR VEHICLES

BACKGROUND OF THE INVENTION

1. Field of the Invention

This invention relates to a bicycle carrier adapted for mounting on a motor vehicle and, more particularly, to apparatus for retaining one or more bicycles in a support arrangement which may be mounted in the receiver portion of a conventional vehicle trailer hitch, on top of a car, or in the bed of a pickup.

2. Description of the Related Art

Bicycle riding has long been a popular recreational activity. In particular, in metropolitan areas and their environs, bicycle paths are maintained for the exclusive use of recreational bicycle riders in parks, along beaches and other available open flatland. Access to areas where facilities for safe, off-road bicycle riding are provided is generally accomplished by motor vehicles which are usually equipped in one way or another with racks or carriers for transporting the bicycles. Moreover, in the past few years, so-called "mountain bikes", motocross competition and other off-road cycling have become increasingly popular. Again, access to areas where such activities are permitted is generally by means of motor vehicles equipped to transport the bicycles.

For many years, more or less standard bicycle transport arrangements have sufficed for the purposes of transporting bicycles by means of motor vehicles. The more conventional carrier racks generally incorporated a provision for supporting the rack on the vehicle bumper, either front or rear, with an arrangement for hanging the bicycle on the carrier and tying or strapping it in place. Oftentimes the carrier rack includes means for connecting the upper end of the carrier to the vehicle to secure it in place. One common type of rack is arranged to hang the top bar of the bicycle frames of two or three bicycles from a pair of horizontal support members with the bicycles being tied together and also to the vehicle. In such an arrangement, the bicycles usually rub and bump together, causing scuffing of the paint finish on bicycle and/or transport vehicle with possibly other damage as well. This problem with this type of rack has been exacerbated with the development of modern bicycles having varying shapes and sizes of frames which preclude their hanging properly. Having the bicycles rub or bump together during transport is clearly unsatisfactory, considering that a good mountain or road bike costs in the range of $800.00 to $3000.00.

Allen U.S. Pat. No. 5,232,134 discloses a bike carrying system which is particularly designed to carry a plurality of bicycles in a manner which maintains spatial separation between them, thereby protecting them from the damage that may occur in the carrier rack systems of the type described above. The patent shows use of straps as a means for securing the bicycles in place on the bicycle support frame. It also calls for removing the front wheel from the bicycle fork before mounting the bicycle on the carrier frame.

The Hannes et al U.S. Pat. No. 5,092,504 discloses a bicycle rack which is provided for the cargo compartment of a pickup truck. While this disclosure involves a mechanical arrangement which is more secure than using straps to mount the bicycles to the rack, it is still somewhat cumbersome to use because it calls for removing the front wheel from the bicycle fork before mounting the bicycle to the rack.

Cole U.S. Pat. No. 4,524,893 discloses a bicycle carrier for mounting on top of a motor vehicle, such as a station wagon. A U-shaped stanchion has a clamping mechanism to retain the bicycle in upright position. Straps are used for holding the bicycle wheels in position.

Carriers for enabling motorcycles to be transported at the front or rear of motor vehicles are also known in the prior art but these generally involve different design considerations from bicycle carriers because of the substantially greater weight and handling difficulty of motorcycles.

A preferred bicycle carrier for transport is one that separates the bicycles from touching each other and will hold the bicycles securely in place. It should have mounting points which are common to most bicycles and should be easy to use, both with respect to installation on the transport vehicle and in placement of the bicycles on the carriers.

SUMMARY OF THE INVENTION

Arrangements in accordance with the present invention satisfy the design criteria of the preferred bicycle carrier described above. A principal feature of arrangements in accordance with the present invention involves the use of a clamping device for the wheels of the bicycle being transported. In its simplest form, this clamping device comprises a pair of parallel panels connected in a U-shaped configuration and provided with a fastening device to squeeze the panels together. One tire of the bicycle slides between the panels and the fastening device, typically a bolt and nut, squeezes the panels together, thereby clamping the tire in place. The clamp may be provided additionally with a locking mechanism to protect the bicycle against theft.

In one particular arrangement in accordance with the invention, a bicycle carrier apparatus is constructed with a central longitudinal support member having one end which slips into the receiver portion of a standard trailer hitch of the Class C type or similar. Such a hitch is fixedly mounted in place on the transport vehicle. The receiver portion is generally centrally located immediately below the rear bumper of the vehicle.

The longitudinal support member is preferably fabricated from hollow square metal tubing, about 1.5 to 2 inches square. A single bicycle carrier mounted on the longitudinal support member comprises a transverse support arm approximately equal in length to the overall length of a standard adult bicycle, less one wheel radius, and similarly formed of hollow box tubing, either square or rectangular in cross-section. At one end of the transverse support arm is affixed, as by welding, a vertical stop member fabricated of metal box tubing like the transverse support arm. The stop member and the support arm may be fabricated of somewhat lighter tubing than the longitudinal support member, since the load carrying demands are less.

A clamp in accordance with the invention is affixed to the vertical stop member a distance above the juncture with the transverse support arm generally approximating the radius of the rear wheel of a bicycle to be transported. Another clamp like the first is mounted to the transverse support arm at a position approximating where the front tire of a bicycle to be transported rests on the support arm. The transverse support arm is mounted on the longitudinal support member with a fixture that permits fore and aft adjustment of the carrier, after which the fixture is tightened so as to establish a rigid mounting arrangement. The transverse support arm is attached to this fixture with lateral positioning so that the weight of a standard-size bicycle is approximately balanced on the longitudinal support member.

In the preferred embodiment of the bicycle carrier apparatus described thus far, two individual bicycle carriers are mounted on the longitudinal support member such that the bicycles positioned thereon face in opposite directions. The individual carriers are mounted in opposing orientations and slightly staggered from each other to minimize interference between the associated bicycles. If more than two bicycles are to be carried, a longer longitudinal support arm may be used and additional individual bicycle carriers may be transversely mounted thereon with the carrier orientations alternating from one carrier to the next. Typically as many as four bicycle carriers may be installed in this manner.

Alternatively, a standard longitudinal support member for two bicycle carriers may be provided with a connector assembly in which a section of box tubing having the dimensions of the receiver of the trailer hitch and forming a receiver socket is welded to the outer end of the longitudinal support member at 90 degrees thereto so it extends vertically from the support member. A short stub of box tubing having the dimensions of the longitudinal support arm may be attached, as by welding, in a vertical orientation to the underside of a second longitudinal support member which may have an additional one or two individual bicycle carriers mounted thereon. The second support member may then be installed on the first longitudinal support member by slipping the stub into the vertical receiver socket and attaching the two firmly in place with a retainer pin. This arrangement permits ready adjustability of the capacity of the bicycle carrier apparatus from a carrier for one or two bicycles to a carrier for three or four. In addition, this arrangement provides for the elevation of the second pair of bicycles relative to the first pair so that additional clearance from the road for the vehicle and carrier combination is achieved.

In its simplest form, the clamping device may be stamped from a single piece of sheet metal into a U-shaped configuration in which the bottom of the U has a width approximating the width of a standard bicycle tire, thereby spacing the opposed parallel sides of the clamp by a suitable distance to receive the tire of one of the bicycle wheels between them. The clamp possesses sufficient flexibility that it may expand slightly around a larger bicycle tire or be squeezed together to encompass a thinner bicycle tire. The two sides of the clamp are provided with opposing holes, strategically located, to receive a fastening device in the form of a bolt and nut which serve to clamp the two sides in frictional engagement with the bicycle tire. An additional pair of opposed holes may be provided to accommodate a padlock or other locking device used to secure the bicycle wheel within the clamp.

In an alternative arrangement, the clamping device is in the form of a backing plate with a pair of side members pivotably attached thereto. A simple hinge mechanism may be used to provide the attachment to the backing plate, one for each of the two planar side members. A nut and bolt may be used as the fastening device, as in the first-mentioned clamping device.

The clamping device is mounted on the carrier by suitable attaching means to the vertical stop member or the transverse support arm, as the case may be. Attachment may be by welding or any standard attaching means.

In an alternative embodiment designed for transporting bicycles in the bed of a pickup, the clamps may be attached to a cross bar which is adapted for mounting transversely between the side rails near the forward end of the pickup bed. The clamps may be affixed to the cross bar by concealed mounting screws or bolts and nuts to which access is blocked when a bicycle tire and wheel combination is positioned within the clamp and secured therein. Where a transverse support device, such as a standard tool box or the like, is already installed in the pickup bed, the clamps can simply be affixed to that device without the need for a special crossbar mount.

Carrier apparatus in accordance with the invention may also be used as a cartop rack. In such an arrangement, two or more individual bicycle carriers are secured on a frame member which extends between the two. This configuration establishes a rigid carrier apparatus which may be secured in position on top of a vehicle, either to an already installed car-top luggage rack or with straps and clips that are customarily used to attach an add-on cartop luggage carrier.

In still another alternative arrangement, the carrier apparatus of the invention is formed in a configuration which permits the bicycles to be transported with the bicycle frames aligned in a generally vertical orientation along the rear end of a motor vehicle such as a station wagon, van or other utility vehicle. In this arrangement, the longitudinal support member which mounts in the receiver portion of the vehicle trailer hitch is relatively short, just long enough to support a T-shaped frame which is welded to the support member in a generally vertical orientation. The individual bicycle carriers are affixed to opposite ends of the T-shaped frame crossbar, preferably positioned on the crossbar so that the lowermost bicycle wheel is approximately at bumper height. Preferably the stop member of the individual bicycle carrier is at the lower end of the carrier, approximately at the level of the longitudinal support member. Further details of a similar arrangement of bicycle carrier apparatus are shown and described in the co-pending application of James D. Fletcher, one of the inventors herein, entitled Bicycle Crank Shaft Support Carrier, application Ser. No. 08/184,996, filed Jan. 14, 1994, which is now U.S. Pat. No. 5,476,203 issued 19 Dec. 1995. The disclosure of that patent application is incorporated herein by reference as though set out in haec verba.

BRIEF DESCRIPTION OF THE DRAWING

A better understanding of the present invention may be realized from a consideration of the following detailed description, taken in conjunction with the accompanying drawing, in which:

FIG. 1 is a perspective view of one particular arrangement of a bicycle carrier apparatus in accordance with the present invention, showing a bicycle in phantom outline in position thereon;

FIG. 2 is a side elevation of a single bicycle carrier of the invention;

FIG. 3 is a plan view of the arrangement of FIG. 1;

FIG. 4 is an end elevation of the individual bicycle carrier of FIG. 2;

FIG. 5 is an enlarged view, in partial section, showing details of the mounting fixture of the individual bicycle carrier of FIG. 2;

FIG. 6 is a plan view from the underside, partially broken away, of the mounting fixture of FIG. 5;

FIG. 11 is a perspective view showing the mounting arrangement of a bicycle retaining clamp mounted for installation in a pickup truck bed;

FIG. 12 is a schematic view showing further details of the clamp arrangement of FIG. 11;

FIG. 13 is a schematic arrangement of a variation of the individual bicycle carrier of FIG. 2;

FIG. 14 is a view of a portion of FIG. 13 showing a bicycle tire clamped in position for transport; and FIG. 15 shows an alternative arrangement for expanding the capacity of the bicycle carrier apparatus of FIG. 1.

DETAILED DESCRIPTION OF THE PREFERRED EMBODIMENTS

Figure 7:
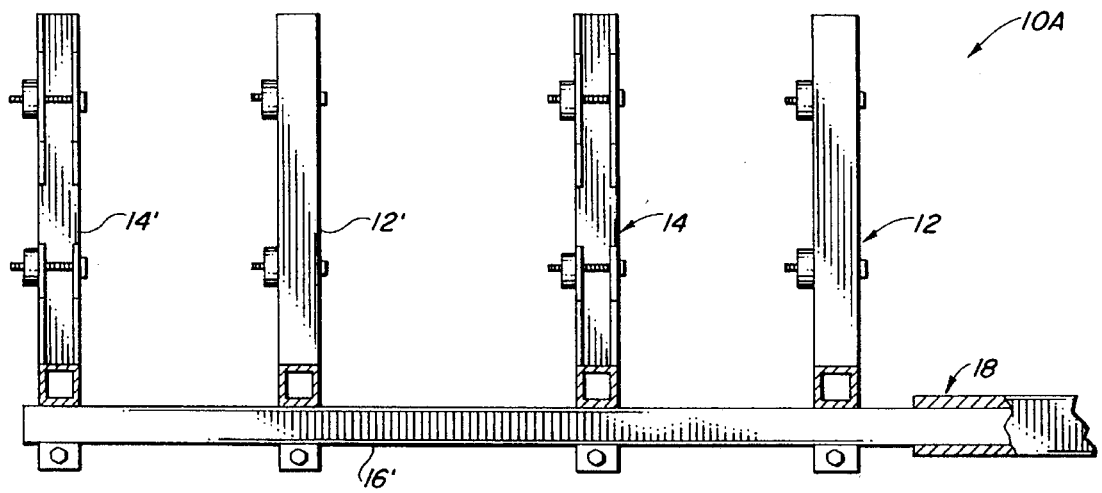
FIG. 7 is a side elevation, partially broken away, showing an alternative embodiment of the invention having four individual bicycle carriers.

One particular arrangement of a bicycle carrier apparatus in accordance with the invention is represented schematically in FIGS. 1–6. This apparatus 10 is shown comprising a pair of individual bicycle carriers 12, 14 mounted transversely on a longitudinal support member 16 which is adapted to be installed in the receiver portion 18 of a conventional vehicle-mounted trailer hitch.

The longitudinal support member 16 is preferably formed of square hollow metal tubing of cross-sectional dimensions such as to permit insertion of the support member into the aperture of the trailer hitch receiver 18 in place of the removable hitch portion to which a trailer hitch ball is customarily attached. The support member 16 is retained in the same manner in the hitch receiver portion 18 with a retainer pin 19 as is customarily used in trailer hitches of the type described.

Each individual carrier 12, 14 comprises a transverse support arm 20 to which a vertical stop member 22 is affixed at a proximal end 24. The stop member 22 is provided with a clamp 26 in the form of a pair of parallel side panels 28, 30 extending from a base plate 32. In its simplest form, the clamp 26 may be stamped from a single piece of sheet metal into a U-shaped configuration in which the bottom of the U has a width approximating the width of a standard bicycle tire. A retainer assembly 34 comprising a bolt 38 and nut 36 is positioned to retain a bicycle wheel within the clamp 26. The side panels 28, 30 are deformable so that, when a bicycle wheel is positioned within the clamp 26 and the nut 36 is tightened on the bolt 38, the bicycle tire is frictionally engaged and the wheel is readily clamped in position. The carriers 12, 14 are mounted in opposing orientation to each other and preferably receive a bicycle with the rear wheel in the clamp 26. Another clamp 26' is mounted at the distal end 25 of the carrier. The clamp 26' is identical in construction to the clamp 26 with its components being designated with like reference numerals, primed.

Each transverse support arm 20 has a mounting fixture 40 for securing it to the longitudinal support member 16. As particularly shown in FIG. 5, the mounting fixture 40 comprises a pair of angles welded to the underside of the transverse arm 20 and spaced apart by a distance equal to the transverse outer dimension of the support member 16. The position of the support arm 20 can be set by moving it along the longitudinal support member 16 and then tightening the bolt and nut combination 44 to fix it rigidly in position.

The carrier apparatus 10 of the first embodiment is shown in FIGS. 1 and 3 as comprising two individual bicycle carriers 12, 14. FIG. 7 shows an arrangement in which four individual bicycle carriers may be installed in carrier apparatus 10A, simply by using a longer longitudinal support arm 16' which is of sufficient length to accommodate four individual bicycle carriers side-by-side.

Figure 8:
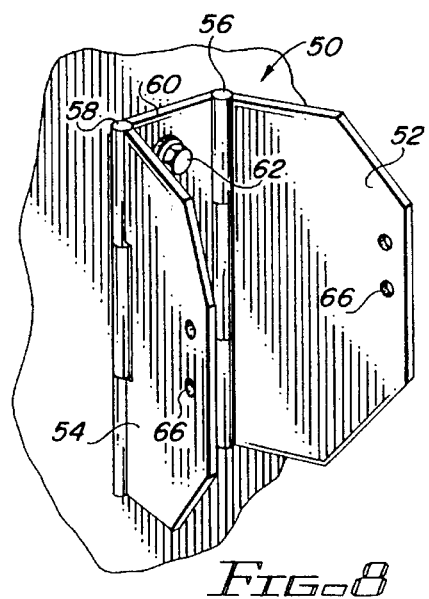
FIG. 8 is a perspective view of one particular clamping device in accordance with the invention.
Figure 10:
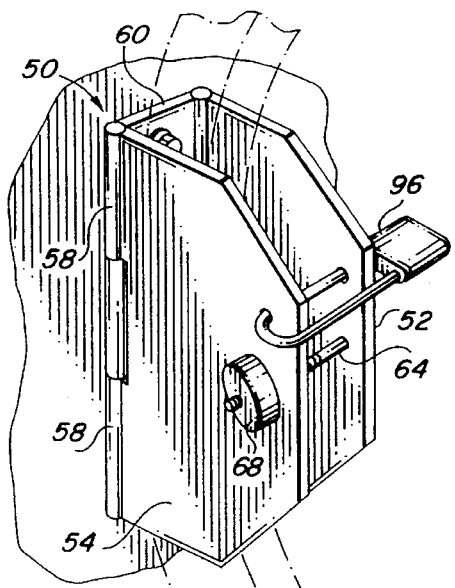
FIG. 10 is another view of the clamping device of FIG. 8, showing its effectiveness in retaining a bicycle tire with a padlock for theft prevention.
Figure 9:
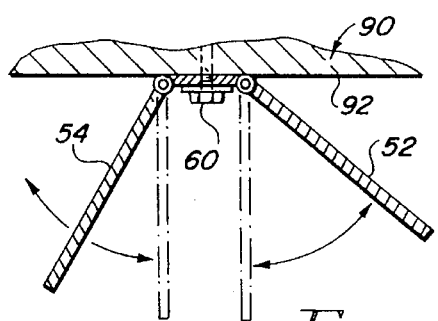
FIG. 9 is a sectional view of the clamping device of FIG. 8, taken along the line 9—9 thereof.

FIGS. 8–10 schematically represent an alternative embodiment to the clamp 26 of FIGS. 1–7. FIGS. 8–10 depict a clamping device 50 comprising a pair of side plates 52, 54 pivotably mounted by hinges 56, 58 to a backing plate 60. Clamp 50 may be mounted to a support member (not shown) by bolts such as 62. Retention of a bicycle wheel within the clamp 50 is effected in the same manner as described hereinabove for the clamp 26. A bolt 64 is installed through aligned holes 66 in the plates 52, 54 and a nut 68 is threaded thereon, drawing the side plates 52, 54 together when the nut 68 is tightened, thereby squeezing the bicycle tire within the clamp 50 to retain the bicycle rigidly in position on the carrier.

Either type of clamp, 26 or 50, may be installed in the manner described herein.

FIGS. 11 and 12 schematically illustrate use of a clamping arrangement of the present invention to support a bicycle in position within the bed of a pickup. A bar 70 is installed by suitable fastening means 72 at opposite ends of the bar 70 to the side panels 74 of a pickup bed. Clamp 76 is intended to represent either type of clamp 26 or 50, disclosed herein. The clamp 76 is slidably mounted on the bar 70 by means of a U-shaped mounting bracket 78 and a pair of bolts 80. Tightening the bolts 80 rigidly secures the clamp 76 at a selected position along the bar 70. A bicycle may then be secured in the pickup bed by positioning a wheel, preferably the rear wheel, in the clamping device 76 and tightening the nut 82 on the bolt 84 until the bicycle tire is tightly held within the clamp 76.

Pickup trucks are not infrequently equipped with a toolbox or similar fixture extending across the forward end of the pickup bed. In such cases, clamps 26 or 50 of the present invention may readily be installed along the rearward surface of such a device. FIGS. 8–10 may be considered to show the clamp 50 being mounted on the rearward wall 92 of a toolbox 90 conventionally installed in a pickup bed. With mounting arrangements using bolts to secure the clamps of the present invention in place, theft is not a problem because when a bicycle wheel is frictionally engaged in the clamp, access to the mounting bolts is blocked by the wheel and it is virtually impossible to remove the clamp. Additional protection against theft of a bicycle which is clamped in position by clamps of the present invention may be afforded by use of a padlock 96 (see FIG. 10) which extends through corresponding aligned holes in the side panels of the clamp.

A variation of the arrangement depicted in FIGS. 1–6 is shown in FIGS. 13 and 14. These figures show an individual bicycle carrier designated 12", equipped with three individual clamping devices 27, 27' and 37. These clamps are similar to the clamps 26, 36 shown in FIG. 2, except that they are smaller and are three in number rather than two. Clamps 27 and 27' are positioned along the transverse support arm 20 and vertical stop member 22 to support a single rear wheel of a bicycle being carried on the carrier 12'. This provides improved stability for the bicycle with lighter weight clamps.

FIG. 15 depicts an arrangement whereby a second support arrangement for an additional pair of bicycles may be mounted on a bicycle carrier apparatus such as that shown in FIG. 1. That portion of the apparatus labelled 10 in FIG. 15 is identical to the apparatus 10 of FIGS. 1–6 with a pair of individual bicycle carriers (only carrier 14 is shown), except for the addition of a mounting socket 102 adjacent the rear end of the longitudinal support member 16. This socket 102 is like the receiver portion 18 of a trailer hitch, having the same dimensions and with provision for a retainer pin 104. The receiver socket 102 is preferably affixed by welding to the longitudinal support member 16. A mating stub 106 is affixed, preferably by welding, to the underside of a second longitudinal support member 16' to complete the connector assembly 107. The stub 106 is fabricated of the same stock as the member 16 so that it readily fits within the receiver socket 102 where it may be retained by the pin 104 in a rigid, secure mounting. The support member 16' preferably supports a pair of individual bicycle carriers (only carrier 12' is shown). This arrangement is disclosed in further detail in companion application Ser. No. 08/184,996 of James D. Fletcher entitled Bicycle Crank Shaft Support Carrier, filed concurrently herewith. This arrangement permits carrier apparatus in accordance with the present invention to be readily expanded to accommodate a second pair of bicycles and is somewhat simpler and quicker to use than the arrangement shown in FIG. 7.

Arrangements in accordance with the present invention provide improvements over those known in the prior art for transporting bicycles by means of conventional motor vehicles. Designed for standard use with a pair of bicycles, one of the individual bicycle carriers may be readily removed so that a single bicycle carrier is provided. In alternative arrangements, additional bicycles may be accommodated in similar fashion so that three or four may be transported in the same way as two. Apparatus of the present invention is principally designed to attach to a vehicle by means of the receiver portion of a conventional trailer hitch which is generally welded in place on a vehicle to project underneath the rear bumper.

A significant feature of the invention is the particular bicycle wheel clamping device which is employed. Clamping devices such as are disclosed hereinabove may be adapted to mount in the bed of a pickup so that bicycles may be rigidly and securely retained by these clamping devices, whereby the bicycles are securely positioned within the bed of the pickup. Clamps of the invention are simply constructed and easy and quick to use while eliminating the necessity sometimes encountered in prior art arrangements of partially dismantling a bicycle to enable it to fit in particular prior art bicycle carriers.

Although there have been described hereinabove various specific arrangements of a bicycle carrier for vehicles in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the annexed claims.

What is claimed is:

1. Bicycle carrier apparatus for supporting the tires of a bicycle wheel for transportation by a motor vehicle, each of said wheels having a tire thereon, said apparatus comprising:

a longitudinal support member having means at one end adapted for attachment to a vehicle-mounted support mechanism; and an individual bicycle carrier mounted on the support member with means for carrying a single bicycle, the carrier including:

an elongate support arm coupled to the support member adapted to support the bicycle with its tires supported by the support arm;

a first clamping device affixed to the support arm at a distal end thereof for releasably securing a first wheel of the bicycle therein; and a vertically extending stop member mounted on the elongate support arm at the proximal end thereof and having a first end affixed to said support arm and a second end with a second clamping device affixed thereto at a position adjacent the second end and displaced from the support arm for releasably securing a second wheel of the bicycle therein;

each said clamping device having adjustable tensioning means for drawing the clamping device into frictional engagement with the tire of the bicycle wheel positioned therein;

wherein the carrier is adjustably positioned along the support member by adjustable mounting means in the form of a pair of angles welded to the underside of the support arm in positions spaced from each other by a distance slightly greater than the transverse dimension of the support member and extending below the support member, and adjustable fastening means for tightening the angles against the sides of the support member to fix the position of the bicycle carrier thereon.

2. The apparatus of claim 1 wherein the angles extend below the bottom surface of the support member and the fastening means comprise a bolt extending through opposed holes in the angles and a nut on said bolt for drawing the angles into secure frictional engagement with the support member.

3. The apparatus of claim 1 wherein the vehicle-mounted support mechanism comprises the receiver portion of a trailer hitch and wherein the support member is a square-cornered hollow box tube having outside dimensions slightly less than the inside dimensions of the trailer hitch receiver portion in order to establish a rigid joint with the receiver portion.

4. The apparatus of claim 1 wherein the support member has a length which is adequate to support a pair of individual bicycle carriers side by side along the support member when the support member is attached to said support mechanism.

5. The apparatus of claim 1 wherein the length of the support member is sufficient to support four bicycle carriers positioned side by side along the support member when the support member is attached to said vehicle-mounted support mechanism.

6. The apparatus of claim 1 wherein each of said clamping devices comprises a pair of opposed parallel side panels spaced apart by the approximate width of a standard bicycle tire and wherein the adjustable tensioning means comprise a bolt extending through holes in said side panels with a nut on said bolt for drawing the panels together around the bicycle wheel tire.

7. The apparatus of claim 6 wherein the side panels of each said clamping device are deformable and are attached to a support plate affixed to the support arm and the stop member, respectively.

8. The apparatus of claim 6 wherein the side panels of each said clamping device are affixed to the side surfaces of the support arm and the stop member, respectively.

9. The apparatus of claim 6 wherein each said clamping device is stamped from sheet metal in the shape of a U.

10. The apparatus of claim 6 wherein the side panels of each of the clamping devices are hinged to a support plate which is attached to the support arm and the stop member, respectively.

11. The apparatus of claim 6 further including locking means in the form of a padlock extending through additional holes in the side panels of at least one clamping device outboard from the position of a bicycle tire within the respective clamping device.

12. The apparatus of claim 1 wherein each said clamping device comprises:

a pair of opposed, generally parallel plates spaced apart by a distance approximating the width of a standard bicycle tire when inflated;

a backing member extending between the plates and supporting them in their spaced-apart juxtaposition;

retaining means for retaining a bicycle wheel and tire in a position between the plates including a retaining member extending from one plate to the other in a position spaced from said backing member by a distance sufficient to encompass a bicycle tire and rim between the retaining member and the backing member; and means for supporting each said clamping device on said arm and stop member, respectively, said supporting means being selectively positioned relative to the support member arm and stop member, respectively, in a position suitable for carrying a bicycle thereon.

13. The apparatus of claim 12 wherein the retaining means further includes adjustable tensioning means for drawing the plates toward each other to frictionally engage the tire of a bicycle wheel positioned between the plates.

14. The apparatus of claim 13 wherein the retaining member is a threaded bolt extending through aligned holes in the opposed plates and wherein the adjustable tensioning means include an adjustable nut threaded on the bolt from the outside of the parallel plate apparatus.

15. Bicycle carrier apparatus for supporting the tires of a bicycle wheel for transportation by a motor vehicle, each of said wheels having a tire thereon, said apparatus comprising:

a longitudinal support member having means at one end adapted for attachment to a vehicle-mounted support mechanism; and an individual bicycle carrier mounted on the support member with means for carrying a single bicycle, the carrier including:

an elongate transverse support arm coupled to the support member adapted to support the bicycle with its tires supported by the support arm;

a first clamping device affixed to the support arm at a distal end thereof for releasably securing a first wheel of the bicycle therein; and a vertically extending stop member mounted on the elongate support arm at the proximal end thereof and having a first end affixed to said support arm and a second end with a second clamping device affixed thereto at a position adjacent the second end and displaced from the support arm for releasably securing a second wheel of the bicycle therein;

each said clamping device having adjustable tensioning means for drawing the clamping device into frictional engagement with the tire of the bicycle wheel positioned therein;

wherein the vehicle-mounted support mechanism comprises the receiver portion of a trailer hitch and wherein the support member is a square-cornered hollow box tube having outside dimensions slightly less than the inside dimensions of the trailer hitch receiver portion in order to establish a rigid joint with the receiver portion, and wherein the transverse support arm is a length of square cornered hollow box tubing with a pair of angles welded to the underside thereof for mounting to the longitudinal support member.

16. The apparatus of claim 15 wherein the stop member is a length of square-cornered hollow box tubing of the same cross-sectional dimensions as the transverse support arm, said stop member being welded to the proximal end of the transverse support arm.

17. Bicycle carrier apparatus for supporting the tires of a bicycle wheel for transportation by a motor vehicle, each of said wheels having a tire thereon, said apparatus comprising:

a first longitudinal support member having means at one end adapted for attachment to a vehicle-mounted support mechanism; and an individual bicycle carrier mounted on the support member with means for carrying a single bicycle, the carrier including:

an elongate support arm coupled to the support member to support the bicycle with its tires supported by the support arm;

a first clamping device affixed to the support arm at a distal end thereof for releasably securing a first wheel of the bicycle therein; and a stop member mounted on the elongate support arm at the proximal end thereof and having a second clamping device affixed thereto at a position displaced from the support arm for releasably securing a second wheel of the bicycle therein;

each said clamping device having adjustable tensioning means for drawing the clamping device into frictional engagement with the tire of the bicycle wheel positioned therein;

further including a second longitudinal support member having at least one individual bicycle carrier adjustably positioned thereon, and a connector assembly comprising a receiver socket attached to the other end of the first longitudinal support member and extending from the upper side thereof, a mating stub attached to the underside of the second longitudinal support member, and a retaining pin for retaining the stub within the receiver socket when installed therein.

18. Bicycle carrier apparatus for supporting the tires of a bicycle wheel for transportation by a motor vehicle, each of said wheels having a tire thereon, said apparatus comprising:

a longitudinal support member having means at one end adapted for attachment to a vehicle-mounted support mechanism; and an individual bicycle carrier mounted on the support member with means for carrying a single bicycle, the carrier including:

an elongate support arm coupled to the support member to support the bicycle with its tires supported by the support arm;

a first clamping device affixed to the support arm at a distal end thereof for releasably securing a first wheel of the bicycle therein; and a stop member mounted on the elongate support arm at the proximal end thereof and having a second clamping device affixed thereto at a position displaced from the support arm for releasably securing a second wheel of the bicycle therein;

each said clamping device having adjustable tensioning means for drawing the clamping device into frictional engagement with the tire of the bicycle wheel positioned therein; and further including a third clamping device having a pair of opposed, generally parallel side panels affixed to the support arm near the proximal end thereof in a position to frictionally engage the tire of the second bicycle wheel placed adjacent the stop member.

19. A bicycle carrier for securing a bicycle by engaging the wheels of the bicycle comprising:

a pair of opposed, generally parallel side panels spaced apart by the approximate width of a standard bicycle tire;

means for mounting said panels to a bicycle carrier in a selected position suitable to receive between the panels a bicycle wheel supported on said carrier;

tensioning means for drawing said panels together to frictionally engage the tire of a bicycle wheel positioned in said clamping device;

said bicycle carrier comprising an elongate support arm with the panel mounting means being affixed to a distal end of said arm, a stop member attached to the elongate support arm at the proximal end thereof, and a second clamping device having a pair of opposed, generally parallel side panels affixed to the stop member in a position to frictionally engage the tire of a bicycle wheel placed adjacent the stop member; and a third clamping device having a pair of opposed, generally parallel side panels affixed to the support arm near the proximal end thereof in a position to frictionally engage the tire of the same bicycle wheel placed adjacent the stop member.

20. The apparatus of claim 19 wherein the side panels of each said clamping device are deformable and are attached to a backing plate affixed to the support arm and stop member, respectively.

21. The apparatus of claim 20 wherein each said clamping device is stamped from sheet metal in the shape of a U.

22. The apparatus of claim 20 wherein the side panels are hinged to a backing plate which is affixed to the support arm and stop member, respectively.

23. The apparatus of claim 20 including locking means in the form of a padlock extending through holes in the side panels of at least one said clamping device outboard from the position of a bicycle tire within the respective clamping device.

24. The apparatus of claim 19 further including a longitudinal support member having means at one end adapted for attachment to a vehicle-mounted support mechanism; and means for mounting the bicycle carrier in a transverse orientation on the longitudinal support member.

* * * * *